United States Patent Office 3,340,326
Patented Sept. 5, 1967

3,340,326
GRAFT COPOLYMERS OF THIOATED POLY-
AMIDES AND ETHYLENICALLY UNSATU-
RATED MONOMERS
Robert W. Faessinger, Media, and John S. Conte, Ridley
Park, Pa., assignors to Scott Paper Company, Delaware
County, Pa., a corporation of Pennsylvania
No Drawing. Original application July 6, 1966, Ser. No.
563,055. Divided and this application Dec. 7, 1966, Ser.
No. 599,732
29 Claims. (Cl. 260—857)

ABSTRACT OF THE DISCLOSURE

Peroxidic initiated graft polymerization process using as substrates thioated nylon and other polyamides prepared, e.g., by reaction of nylon or other polyamide, with aqueous alkali and carbon disulfide, carbonyl sulfide, or salt thereof, and the copolymers produced by the process.

This invention relates to processes for producing a copolymer of an ethylenically unsaturated monomer with substantially water insoluble substrates as defined herein by peroxidic free radical initiated graft polymerization and to the novel copolymers produced thereby. This application is a continuation-in-part of application S.N. 491,395, filed Sept. 29, 1965, now abandoned and a division of application S.N. 563,055, filed July 6, 1966, as a continuation-in-part of applications S.N. 271,491, now abandoned, and 271,492, filed Apr. 8, 1963; 339,324, filed Jan. 22, 1964, now abandoned; 345,577, filed Feb. 18, 1964, now abandoned; 432,816, 432,825, 432,834, 432,853, 432,855, 432,902 and 432,904, filed Feb. 15, 1965, all now abandoned; and 491,395, filed Sept. 29, 1965, now abandoned.

It is an object to provide novel graft polymerization processes. Another object is to provide graft polymerization processes free from one or more of the limitations or disadvantages of prior art graft polymerization processes. It is another object to provide novel graft polymers. Other objects will be apparent to those skilled in the art to which this invention pertains.

According to the processes described herein a substantially water-insoluble, polyamide substrate as defined herein is reacted via peroxidic free radical initiated graft polymerization, with an ethylenic unsaturated monomer to produce a graft polymer.

British Patent 818,412 discloses a redox graft polymerization system in which a ferrous, chromous, manganous, etc., ion is bound to the substrate by the ion exchange capacity of the substrate. The present graft polymerizations utilize sulfur containing substrates as defined herein to provide, with the peroxidic initiator, the redox system used to effect the graft polymerization.

There are problems associated with prior art graft polymerization processes, such as the need for an inert atmosphere, need to operate at either low, high or specific temperatures, use of expensive metal catalysts, use of dangerous radioactive materials (often leading to substrate degradation), need for non-aqueous system, need for concentrated reaction systems, etc. Oxidative processes using ozone or oxygen, like high-energy radiation, lead to serious strength losses of the substrate. Ceric ion-initiated chemical reactions produce excessive amounts of vinyl homopolymer. The present graft polymerizations are free from one or more of the aforesaid limitations and disadvantages. Moreover, the graft polymerizations have many advantages not possessed by other types of graft polymerizations.

The graft polymerizations described herein are novel in that both the substrate and monomer participating in the copolymerization may be of diverse nature. The substrate may be used in any of its conventional forms. The copolymerization may be accomplished as a batch process or as a continuous treatment process. Through the proper practice of each invention, strength losses can be avoided and a highly efficient addition of the monomer or monomers to the substrate is accomplished. The properties of the substrate can be modified in virtually any manner desired by the choice of monomer or combination of monomers and the amount thereof grafted to the substrate.

The present graft polymerizations can be carried out in dilute aqueous solutions of monomer or monomers, as well as in concentrated solutions of monomer or monomers. Also, each may be conducted in either dilute or concentrated suspensions of the substrate.

An inert atmosphere is not essential, but may be used if desired. A very surprising aspect of the polymerizations is monomer solution need not be entirely free from polymerization inhibitors.

Extremes of temperature are not ordinarily necessary as the co-polymerization will proceed at ambient temperatures.

PEROXIDIC INITIATOR

The graft polymerizations described herein utilize a peroxidic initiator as part of the redox system. By redox system is meant the well known systems of the type described in Gaetano F. D'Alelio, Fundamental Principles of Polymerization, John Wiley and Sons, New York, 1952. Such peroxidic initiators include hydrogen peroxide, persulfates such as ammonium, sodium or potassium persulfate, hydroperoxides such as t-butyl hydroperoxide, diisopropylbenzene hydroperoxide, cumene hydroperoxide, 1-phenylethylhydroperoxide, etc., diacylperoxides such as benzoyl peroxide, acetyl peroxide and the like, di-alkyl peroxides such as di-t-butyl peroxide, dicumyl peroxide, etc.; peresters such as t-butyl peroxyacetate, t-butyl peroxybenzoate and the like; peracids such as performic acid, peracetic acid, perbenzoic acid, peroxylactic acid and the like; and others such as dialkyl peroxydicarbonates. These peroxy compounds must be capable of initiating a free-radical polymerization by themselves or in the presence of an activator, such as a reducing agent. The preferred group of peroxidic free-radical initiators are those that are water-soluble when the copolymerization is conducted in an aqueous medium.

As would be expected, the peroxidic initiator should be uniformly distributed throughout the monomer solution.

MONOMERS

The monomers which can be co-reacted with the substrate in the manner described herein to yield new graft polymers are those ethylenically unsaturated compounds which readily homopolymerize or readily copolymerize with other ethylenically unsaturated compounds either in bulk, or in an aqueous solution, or as an emulsion, when exposed to a redox system capable of initiating a polymerization or copolymerization. By the term monomer is meant monomers having the ethylene group at an unsubstituted terminal carbon atom, i.e., vinyl compounds of the formula $H_2C=CR_1R_2$ in which $R_1$ is hydrogen, then $R_2$ is aryl, e.g., styrene, vinyl toluene, vinylbenzyl chloride, vinyl naphthalene, divinyl benzene, p-bromo-styrene, etc; and if $R_1$ is hydrogen, methyl or ethyl, the $R_2$ is $-CN$, e.g., acrylonitrile, methacrylonitrile, ethacrylonitrile and the like, or $R_2$ is

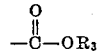

in which $R_3$ is hydrogen or alkyl, e.g., methylacrylate, acrylic acid, methacrylic acid, ethacrylic acid, methyl methacrylate, ethyl acrylate, ethyl methacrylate, propyl acrylate, butyl acrylate and the like or the various substituted forms of the ethyl, propyl or butyl groups such as hydroxyethyl acrylate, (hydroxyethyl) methacrylate, hydroxypropyl acrylate, hydroxypropyl methacrylate, halo alkyl acrylate such as chloroethyl acrylate, also glycidyl acrylate, glycidyl methacrylate, ethylene glycol dimethacrylate, cyanoethylacrylate etc., or $R_2$ is

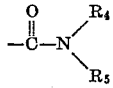

$R_4$ and $R_5$ being hydrogen or alkyl, e.g., acrylamide, methacrylamide, ethacrylamide, N-methylol acrylamide, methylene bis acrylamide, N-isopropyl acrylamide, N,N-dimethyl acrylamide, N,N-diethyl acrylamide and the like, or $R_2$ is

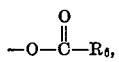

$R_6$ being hydrogen, methyl, ethyl, ethylene, etc., e.g., vinyl acetate, vinyl formate, vinyl acrylate, vinyl methacrylate and the like, or $R_2$ is a halogen or a heterocyclic group, e.g., vinyl chloride, N-vinyl pyrrolidone, vinyl pyridine and the like, as well as other vinyl compounds such as acrolein, vinylidene chloride, vinyl methyl ether, vinyl ethyl ether, divinyl sulfone, etc.

Ethylenically unsaturated monomers which can be copolymerized with the above-mentioned vinyl and vinylidene monomers to form novel, copolymerized products of this invention are maleic acid, fumaric acid, dimethyl maleate, dibutyl maleate, dimethyl fumarate, dibutyl fumarate, maleic anhydride, diallyl fumarate, diethyl fumarate, itaconic acid, dimethylaminoethyl methacrylate, diethylaminoethyl acrylate, t-butylaminoethyl acrylate and the like.

Of the above, one or a mixture of the following polymerizable or copolymerizable monomers are preferred for modifying polyamide substrates: styrene, p-chloromethyl styrene, vinyl toluene, acrylamide, acrylic acid, acrylonitrile, methacrylamide, N,N-methylene-bis-acrylamide, methacrylic acid 2-cyanoethyl acrylate, n-butyl acrylate, n-butyl methacrylate, ethyl acrylate, ethyl methacrylate, glycidyl acrylate, glycidyl methacrylate, methyl acrylate, methyl methacrylate, ethylene glycol dimethacrylate, hydroxypropyl methacrylate, hydroxyethyl methacrylate, hydroxyethyl acrylate, hydroxypropyl acrylate, vinyl chloride, vinylidene chloride, vinyl acetate, divinyl benzene, divinyl sulfone, and chloroethyl acrylate.

SUBSTRATES

The water-insoluble substrates utilized in the graft polymerization processes described herein are thioated polyamides.

The term "substantially water-insoluble" means a substrate whose solubility, in the form in which it is employed, in water at 30° C. or less does not exceed about 10 percent of its weight. Because the substrate used in the graft polymerizations described herein is usually formed under alkaline conditions, both it and the polymeric substance from which it is formed must also be substantially alkaline insoluble, at least at the alkaline pH used to form the substrate and to graft polymerize, if alkaline conditions are employed.

As disclosed in copending application S.N. 491,395, although the structure of the reactive polyamide intermediate has not been established, it appears on the basis of present knowledge, that this intermediate may consist of a thiocarbonate or a thiocarbamate radical bound tenaciously to the polyamide substrate; such pronounced affinity of the thiocarbonate and thiocarbamate radicals for the polyamide substrate is demonstrated by the fact that repeated washings and soakings in water, which appears to be the best solvent for this system, fail to separate the thiocarbonate or thiocarbamate radical from the substrate. This stable, reactive polyamide intermediate is henceforth referred to as the "thioated polyamide," or, in a narrower sense, as the "thioated nylon," even though the sulfur-containing moiety may be a thiocarbonate radical, a thiocarbonate half-ester radical, or a thiocarbamate radical.

The thioated polyamide substrates can be produced from synthetic linear polyamides prepared from polymerizable monoamino carboxylic acids or their amide-forming derivatives, or from suitable diamine and suitable dicarboxylic acid, or from amide-forming derivatives of these compounds. A suitable class of polyamides is represented by structures where the intracarbon amide linkages are other than exclusively aromatic, i.e., there is at least one aliphatic —HCR group in each repeating unit of the polymer molecule. However, exclusively aromatic intra-carbon amide linkages are also included. The —R— group may be hydrogen, halogen, monovalent organic radical, alkylene or the like. Typical of such polyamides are those formed from an aliphatic diamine and an aliphatic acid and containing the repeating unit

wherein —X— and —Y— represent divalent aliphatic or cycloaliphatic groups and —Z— represent the —CONH— linkage. Polyhexamethylene adipamide and polycaproamide (i.e., nylon 66 and nylon 6) are typical. Other suitable polyamides are those having the repeating structure —A—Z—X—Z— wherein A is a divalent aromatic radical and —X— and —Z— are as defined above. Polyhexamethylene terephthalamide is illustrative of such polymers. Additionally, polyamides having repeating units such as —A—Z—B—Z— and —X—Z—B—Z— wherein —B— is divalent alkaryl (such as xylylene) may be used. Another class of suitable polyamides containing other than aromatic intracarbonamide repeating units are those prepared from reactants with hetero atoms in the chain such as piperazine and adipic acid, piperazine and terephthalic acid and the like. The preferred polyamides are those of high molecular weight, i.e., they are fiber-forming, have a non-tacky surface at room temperature and an average molecular weight of about 10,000 (relative viscosity, 24). Preparation of such polyamides is illustrated in U.S. Patents 2,071,250, 2,071,253, and 2,130,948. It should be stressed that many thousand different polyamides are known. Representative groups are listed in: "Encyclopedia of Chemical Technology," edited by Raymond F. Kirk and Herman F. Othmer, vol. 10, p. 919 (1953), Interscience Publishers, New York. Of the more readily available polyamides the following are useful: nylon 2–6 (ethylene-diamine adipic acid polyamide), nylon 2–8 (ethylene-diamine suberic acid polyamide), nylon 6—6 (hexamethylenediamine adipic acid polyamide), nylon 8–2 (octamethylenediamine oxalic acid polyamide), nylon 4(4 - aminobutyric acid polyamide), nylon 6(6 - aminocaproic acid polyamide), nylon 7(7-amino-enanthylic acid polyamide), nylon 9(9-aminopelargonic acid polyamide), nylon 11(11-aminoundecylic acid polyamide), etc. The nylon nomenclature used is explained on page 917 of the abovementioned encyclopedia.

Moreover, within the scope of this invention are novel polyamide intermediates which are derived from the interaction of carbon disulfide and certain carbon disulfide derivatives with long-chain, water-insoluble, synthetic polyamide substrates which form rapidly and are remarkable stable at ordinary ambient temperatures in both the wet and dry state.

The polyamide substrates can be used in any of their conventional physical forms, e.g., as a powder, fibers, filaments, threads, yarn, woolen cloth, knitted fabrics, non-woven fabrics, beads, rods, sheets, films, etc.

DESCRIPTION OF PROCESS

A. Thioated substrate formation

The thioated substrate which is graft polymerized can be prepared by wetting the corresponding non-thioated substrate with an alkaline solution. This is done, generally, with a sodium hydroxide solution, or a solution of some other alkali metal hydroxide. The strength of the alkaline solution used in each particular case will be dependent, of course, upon the nature of the substrate and the type of end-product desired; but generally, concentrations in the range of about .05 molar to about 1 molar are preferred. The amount of alkali or alkaline salt or mixtures of alkalies and alkaline salts used is that amount necessary to achieve the desired degree of thiocarbonation of the substrate. Unless a very high or very low degree of thioation is desired, the amount of alkali employed is not particularly critical so long as it does not result in the production of a water soluble thioate. Such alkalies as lithium, sodium, potassium, rubidium, and cesium hydroxides, ammonium hydroxide, quaternary ammonium hydroxides such as tetramethylammonium hydroxide, methyltriethylammonium hydroxide, trimethylbenzylammonium hydroxide and the like, quaternary phosphonium hydroxides such as tetraethylphosphonium hydroxide, trimethylphenylphosphonium hydroxide, methyltriethylphosphonium hydroxide, trimethylisoamylphosphonium hydroxide, and the like, sulfonium hydroxides such as triethylsulfonium hydroxide, methyldiethylsulfonium hydroxide, dimethylbenzylsulfonium hydroxide, methyldiethylsulfonium hydroxide and the like, quaternary arsonium hydroxides such as trimethylphenylarsonium hydroxide, tetraethylarsonium hydroxide, methyltriphenylarsonium hydroxide and the like, and quaternary stibonium hydroxides such as tetramethylstibonium hydroxide, tetraethylstibonium hydroxide, methyltriethylstibonium hydroxide and the like, as well as the slightly soluble alkaline earth metal hydroxides such as calcium, strontium, barium, etc. may be used, although the preferred method of preparation of the alkaline earth metal salts of the thioated substrate is from the alkali metal salt of the thioated substrate by metathesis. An alkali metal salt of the thioated substrate may also be converted to a quaternary ammonium, sulfonium, quaternary phosphonium, quaternary arsonium or quaternary stibonium salt of the thioated substrate through metathesis.

In addition to the strong and relatively strong bases mentioned above, basic salts, and water soluble organic amines serve equally well. Such basic salts, or mixtures of these salts as sodium carbonate, trisodium phosphate, disodium hydrogen phosphate, disodium ammonium phosphate, sodium silicate, sodium aluminate, sodium antimoniate, sodium stannate, sodium cyanide, sodium cyanate, sodium sulfide, potassium carbonate, tripotassium phosphate, dipotassium phosphate, potassium silicate, potassium aluminate, potassium antimoniate, potassium stannate, potassium cyanide, potassium cyanate, potassium sulfide, lithium carbonate, trilithium phosphate, dilithium hydrogen phosphate, lithium silicate, and the like, as well as such water-soluble amines as methylamine, ethylamine, dimethylamine, pyridine, and such quaternary ammonium hydroxides as tetramethylammonium hydroxide and benzyltrimethylammonium hydroxide are just a few examples of basic materials which have served equally well in the preparation of the various water-insoluble thioated polyamides. In fact, a basic salt whose aqueous solution has a pH of about 8 or 9 or greater may be suitable. It should be recognized, also, that a mixture consisting of a basic salt and an inorganic or organic hydroxide is included in this group. However, those basic salts which are known to chemically modify the substrate and which would thereby interfere with the thioation process are to be avoided when practicing this invention.

Thioation can be accomplished by bringing the alkaline-wet substrate into intimate contact with carbon disulfide or carbonyl sulfide. Either vaporous carbon disulfide or carbonyl sulfide or a solution of the sulfide in any inert solvent or an aqueous emulsion of the sulfide in an inert water immiscible organic solvent may be used. The thioation reaction is conducted as long as is necessary to acquire the desired degree of thioation. Usually merely exposing the alkaline substrate to the carbonyl sulfide or carbon disulfide suffices.

Thioation is of a relatively low order, i.e., substrates are produced having thioate sulfur contents of the order of 0.5 percent and usually 0.3 percent or less. The techniques known in the art can be used to produce water insoluble thioated substrates, e.g., using carbon disulfide or carbonyl sulfide in the presence of alkali to produce a thioated substrate.

A wide variety of thioate salts can be produced by reacting, by metathesis, an ammonium, organic ammonium, phosphonium, sulfonium, arsonium, stibonium salt or an alkali metal salt such as lithium, sodium, potassium, etc. of the thioated polyamide with a water-soluble salt of a metal or mixture of metals from Group I–B of the Periodic Table such as Cu, Ag, and Au; Groups II$a$ and II$b$ such as Mg, Ca, Sr, Zn, Cd, etc.; Groups III$a$ and III$b$ such as Sc, Y, La, Al, Ga, etc. Group IV$b$ such as Ti, Zr, etc., as well as Ge, Sn and Pb; Group V$b$ such as V, Nb, etc.; as well as Bi; Group VI$b$ such as Cr, W, etc.; Group VII$b$ such as Mn, etc.; and Group VIII such as Fe, Co, Ni, Os, etc., to yield a new thioate derivative of the metal.

In general, the previously described alkali metal salts of the thioated polyamide are used if copolymerization is to be carried out without undue delay. At times, however, it is advantageous to effect a conversion of the alkali metal thioate salt to a salt which is more stable, or which is a more reactive intermediate. For example, an aluminum salt of the thioated polyamide is prepared by passing an aluminum sulfate or aluminum acetate solution through, about, or over an alkali metal salt of the thioated polyamide substrate. The zinc salt is prepared from zinc chloride or some other soluble zinc salt, zirconyl salt from zirconium oxychloride, uranyl salt from uranyl acetate, lead salt from lead acetate, and ferrous salt from ferrous ammonium sulfate or ferrous chloride, etc. This technique is especially useful when a soluble hydroxide or basic salt of the desired cation is non-existent or unavailable.

The thioated substrate, when graft polymerized with the monomer, must be substantially free from any water-soluble by-products of the thioate formation or thioate substrate decomposition, i.e., decomposition of thioate groups, which are known in the art to be labile. Thus, after its formation the thioated substrate, in the form of an alkali metal salt, alkaline earth metal salt, or an ammonium salt, or the previously described converted metal salts, is washed with water to remove water-soluble reaction by-products and free metal ions, preferably immediately prior to its suspension in an emulsion or solution of the polymerizable ethylenically unsaturated monomer to ensure no further formation of by-products prior to polymerization.

B. *Polymerization*

Graft polymerization is accomplished by reacting the thioate derivative of the substrate either as a salt or the corresponding free acid obtained by converting an ammonium, organic ammonium, sulfonium, phosphonium, arsonium, stibonium, or an alkali metal salt of the thioated polyamide to the free acid of the thioated polyamide, with an ethylenically unsaturated monomer or monomers from one of the groups set out above in the presence of a peroxidic free radical initiator.

The copolymerization reaction is conducted in either an aqueous or non-aqueous system, but preferably and ordinarily in an aqueous system, in which the monomer is uniformly distributed. When the reaction medium is aqueous, a solution, suspension, or an emulsion of the ethylenically unsaturated monomer can be used to achieve uniform distribution of the monomer. The presence of a wetting agent in the reaction medium is advantageous since it facilitates monomer penetration into the thioate substrate. Emulsifiers can be used to achieve a uniform emulsion of an insoluble monomer and/or peroxidic initiator.

The selected thioated polyamide can be used in virtually any proportion to the monomer, e.g., from about 0.5 percent to 99.9 percent by weight based on the ethylenically unsaturated monomer. The monomer can also be used in almost any concentration in the solution, e.g., from about 1 percent to about 100 percent of the total reaction solution. The solution can be buffered, if necessary, or its pH adjusted to provide the best polymerization conditions for the selected monomers. After adding a water soluble peroxidic free-radical initiator to the solution containing the substrate and monomer, the reaction will proceed at virtually any temperature, e.g., from about 0° to about 100° C. Reaction times can vary from 3 minutes to about 96 hours or longer and reaction pressure can be atmospheric, subatmospheric or superatmospheric, depending upon the monomer and the type of product desired. The thioated substrate can also be added to a mixture of the monomer and peroxidic initiator in the selected reaction media. The usual graft polymerization techniques employing a peroxidic initiated system can be used. However, because of the ease of graft polymerization, less rigorous conditions are ordinarily required. For example, mildly acidic aqueous conditions at room temperature are sufficient to achieve any degree of monomer add-on desired, e.g., from 5 percent to 500 percent.

As is well known in the art, the properties of the graft polymer produced depends upon the substrate used, the monomer or mixture of monomers used, the percent of add-on of monomer achieved, and the reaction conditions employed.

The graft polymer can, if desired, be purified using conventional techniques, e.g., to remove sulfur containing products, monomer, homopolymer, alkali, etc.

Because the thioate groups of the substrate are unstable, it is preferred that the graft polymerization process be part of a multiple step process comprising (a) forming the thioated substrate, (b) washing the substrate with water to remove the water-soluble by-products of the thioate step, and (c) mixing the freshly washed thioated substrate with the monomer-peroxidic initiator solution to initiate polymerization. Homopolymer formation can sometimes be significantly reduced by employing these steps as part of an uninterrupted sequence, at least the washing and polymerization steps.

*Graft polymerization of polyamide substrates*

Because most polyamides (e.g., nylon) contain no significant amount of hydroxyl groups, the graft polymerization apparently does not appear capable of proceeding through a thioated derivative in which thiocarbonate groups are chemically part of the polyamide polymer. In any event, the graft polymers can be produced by the same techniques as if true thiocarbonate polyamide ester groups were formed, i.e., using polyamide wet with alkali and carbonyl sulfide or carbon disulfide in the manner described above. Alternatively, the polyamide can be reacted with an aqueous solution of a water soluble salt of an acid of one of the formulae:

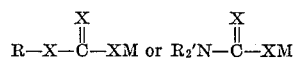

where X is chalcogen at least one of which is sulfur and M is hydrogen or an alkali metal or an ammonium, phosphonium, or sulfonium ion and R is M or alkyl of 1 to 7 carbon atoms, e.g., methyl, ethyl, propyl, isopropyl, butyl, etc., and R' is hydrogen or lower-alkyl.

Thioated polyamids can be prepared by soaking the selected polyamide for about five minutes to several hours in about a 0.5 percent up to a saturated solution, but preferably in about a 6 percent to 15 percent solution of sodium thiocarbonate, which can be prepared by dissolving carbon disulfide or carbonyl sulfide and sodium hydroxide in the molar ratios of about 1:1 to 1:2, in sufficient water and, with agitation, to yield a clear, homogeneous, colored solution; washing the thioated polyamide thoroughly with water to remove all soluble products; and then mixing the washed, thioated polyamide with at least one polymerizable vinyl monomer listed above, present in the form of a solute or, if insoluble, as a mechanical dispersion, or an emulsion. The solution can be buffered in the range of about pH 1 to pH 6 if necessary. A water-soluble peroxidic free-radical initiator is then added to this reaction medium and the reaction is allowed to proceed at a temperature of about 0° C. to about 100° C., e.g., for about ½ hour to about 96 hours. The thus-formed copolymer can be thereafter purified, if desired, using conventional techniques.

Alternatively, the thioated polyamide can be prepared by soaking the polyamide in about a 1 percent to about 10 percent, but preferably in a 2 percent to 4 percent aqueous solution of potassium ethyl dithiocarbonate ($CH_3CH_2OCSSK$) or some other water-soluble alkali metal alkyldithiocarbonate, such as sodium n-butyl dithiocarbonate, potassium isopropyl dithiocarbonate, and the like, or in ammonium dithiocarbamate ($H_2NCSSNH_4$) or some other soluble dithiocarbamate salt such as ethylammonium N-ethyl dithiocarbamate, t-butylammonium N-t-butyl dithiocarbonate, sodium N-ethyl dithiocarbamate, and the like, for three minutes to about four hours, but preferably from ten to 120 minutes.

In order to describe the present invention so that it may be more clearly understood, the following examples are set forth in which all parts are expressed in parts by weight unless otherwise stated. These examples are set forth primarily for the purpose of illustration, and any specific enumeration of detail contained therein should not be interpreted as a limitation on the concept of this invention.

*Example 1.*—Five parts of nylon 66 staple were soaked for about ten minutes at 25° C. in an emulsion consisting of 15 parts carbon disulfide, 15 parts sodium hydroxide, 0.05 part of a surfactant mixture composed of 20.3% Atlas Chemical Ind., Inc. Brij 35 (a high-molecular-weight polyethylene lauryl ether) and 79.7% Atlas Chemical Ind., Inc. Brij 30 (a low-molecular-weight polyethylene lauryl ether) which has an Atlas HLB (hydrophile-lipophile balance) System rating of 11, and 220 parts water in order to thioate the nylon 66 staple.

The thioated nylon was washed thoroughly with water to remove adhering emulsion and all soluble by-products; then suspended for four hours at 50° C. in 100 parts of a 5% aqueous solution of acrylic acid to which had been added three parts of 30% hydrogen peroxide. At the end of this reaction time, the nylon product, which amounted to six parts, was recovered by washing with water and drying in a warm oven.

*Example 2.*—Five parts of a nylon 66 knitted sock were thioated for 40 minutes in the same manner as described above in Example 1, then suspended in a solution composed of five parts acrylamide, 95 parts distilled water and three parts of 30% hydrogen peroxide for four hours at 50° C. The resultant product which amounted to 6.2 parts was washed well with water and dried in a warm oven.

*Example 3.*—Five parts of nylon 66 staple were thioated for one hour at 25° C. in the manner described above in Example 1 and then suspended in an emulsion prepared from five parts of ethyl acrylate, 95 parts of distilled water, and 0.15 part of Tween 85 (a polyoxyethylene sorbitan trioleate surfactant) to which were added, just prior to the addition of the thioated nylon, three parts of hydrogen peroxide. This suspension was maintained at 50° C. for four hours after which time the fibrous product was removed from the reaction medium, washed thoroughly with water and dried in a warm oven. The yield of product amounted to 8.2 parts.

*Example 4.*—Five parts of a nylon 66 knitted sock were thioated for ten minutes at 25° C. as described in Example 1, then suspended in an emulsion composed of five parts acrylonitrile, 5.4 parts 90% formic acid, 85.6 parts distilled water and 0.15 part Tween 85 to which suspension were then added three parts of 30% hydrogen peroxide. After 20 hours at 50° C. the reaction was terminated by thoroughly washing the nylon copolymer with water; the air-dried product weighed 6.7 parts.

*Example 5.*—Five parts of nylon 66 staple were soaked for 1.5 hours at about 25° C. in an emulsion consisting of ten parts of diethanolamine, ten parts carbon disulfide, 0.05 part of a surfactant mixture, having an Atlas HLB–11 rating and of the type disclosed in Example 1, and 230 parts of water in order to thioate the nylon staple. The resultant thioated staple was washed thoroughly with water to remove any adhering carbon disulfide emulsion and all soluble by-products and then suspended in an emulsion composed of one part acrylonitrile, four parts styrene, 0.15 part Tween 85, and 95 parts of distilled water to which emulsion were added three parts 30% hydrogen peroxide just prior to suspending the fiber. This reaction mixture was maintained at 50° C. for four hours and yielded a product which weighed 7.2 parts after washing and drying in a warm oven.

The procedure above was repeated in all details with the exception that the ten parts of diethanolamine used in the thioation emulsion was replaced by ten parts of triethanolamine. In this case, the washed and dried product amounted to 8.1 parts.

*Example 6.*—Eight parts of nylon 66 staple were soaked for five hours at 25° C. in 200 parts of a 2.5% aqueous solution of potassium ethyldithiocarbonate (potassium ethyl xanthate) after which the staple was thoroughly washed with water to remove all soluble materials and then suspended for two hours at 50° C., followed by sixteen hours at 25° C. in 100 parts of a 10% aqueous solution of acrylic acid which contained four parts of 30% hydrogen peroxide. The well washed and oven-dried product amounted to 10.8 parts.

*Example 7.*—Eight parts of a nylon 66 knitted sock were soaked for five hours at 25° C. in a 5% solution of disodium dithiocarbonate which has been prepared by reacting 8 parts sodium hydroxide with 7.6 parts carbon disulfide in 306.4 parts water until a clear, orange, homogeneous solution resulted. The thus-formed thioated nylon was washed thoroughly with water, then reacted with acrylic acid in the same manner as described in Example 6. The washed and oven-dried copolymeric product amounted to 11.7 parts.

*Example 8.*—Eight parts of nylon 66 staple were soaked for five hours at 25° C. in a 5% solution of sodium dithiocarbonate which had been prepared by reacting 4 parts of sodium hydroxide with 7.6 parts of carbon disulfide in 220.4 parts of water until a clear, orange, homogeneous solution resulted. The thus-formed thioated nylon was washed thoroughly with water, then reacted with acrylic acid in the same manner as described in Example 6. The well washed and oven-dried copolymeric product amounted to 10.7 parts.

*Example 9.*—Five parts of nylon 66 staple were soaked for one hour at 25° C. in a 15% solution of dipotassium dithiocarbonate which had been prepared by reacting 11.2 parts of potassium hydroxide with 7.6 parts of carbon disulfide in 106.2 parts of water until a clear, orange, homogeneous solution resulted. This thioated staple was then washed thoroughly with water and suspended in an emulsion prepared from 5 parts ethyl acrylate, 0.15 part Tween 85, and 95 parts distilled water to which emulsion were added 3 parts of 30% hydrogen peroxide prior to the addition of the thioated fiber. This mixture was maintained at 50° C. for 2½ hours before terminating the copolymerization by washing the nylon staple thoroughly with water. The oven-dried product consisted of 8.2 parts.

*Example 10.*—Five parts of nylon 66 staple were soaked for two hours at about 25° C. in a 15.4% solution of sodium thiocarbonate which had been prepared by reacting 24 parts of sodium sulfide nonahydrate with 7.6 parts of carbon disulfide in 84.2 parts of water until a clear, orange, homogeneous solution formed. This thioated nylon was washed thoroughly with water and then suspended in an emulsion containing 5.0 parts ethyl acrylate, 0.15 part Tween 85 and 95 parts distilled water to which emulsion were added 3 parts of 30% hydrogen peroxide just prior to the addition of the thioated nylon. After three hours at 50° C. the reaction was terminated by washing the copolymerized nylon product thoroughly with water. The dried product amounted to 8.8 parts.

*Example 11.*—Five parts of nylon staple were thioated as above in Example 10, then suspended in a solution consisting of 5 parts of acrylamide, 3 parts 30% hydrogen peroxide in 95 parts distilled water. The yield of washed and oven-dried product amounted to 6.3 parts.

*Example 12.*—Five parts of nylon 66 staple were thioated for two hours at about 25° C. in a 14.4% solution of ammonium thiocarbonate solution which had been prepared by reacting 6.8 parts of ammonium sulfide with 7.6 parts of carbon disulfide in 100 parts of water until a clear, orange, homogeneous solution resulted. This thioated nylon staple was washed thoroughly with water, then suspended in an emulsion composed of 5 parts ethyl acrylate, 0.15 part Tween 85, 95 parts distilled water to which emulsion were added 3 parts of 30% hydrogen peroxide just prior to the addition of the thioated nylon. After 5.5 hours at 50° C. the reaction was terminated by thoroughly washing the product. The oven-dried yield was 7.1 parts.

*Example 13.*—Five parts of nylon 66 staple which had been soaked in carbon disulfide for one hour were freed of excess carbon disulfide and placed in a vacuum desiccator over a 70% aqueous solution of monoethylamine and exposed to the moist amine vapors for 2.5 hours at 25° C. This thioated nylon was then washed thoroughly to remove all soluble products and unreacted carbon disulfide, then suspended for 20 hours at 50° C. in 100 parts of a 5% solution of acrylic acid to which had been added 3 parts of 30% hydrogen peroxide. The resultant copolymeric product, after being washed and dried, weighed 7.5 parts.

*Example 14.*—Five parts of nylon 66 staple which had been soaked in 2% sodium hydroxide solution for 0.5 hour were freed of excess hydroxide solution, then placed in a vacuum desiccator over carbon disulfide for two hours at about 25° C. This thioated nylon was washed well with water to remove all soluble products, then suspended for three hours at 50° C. in 100 parts of a 5% acrylic acid solution to which had been added 3 parts of 30% hydrogen peroxide. The washed and oven-dried product amounted to 6.6 parts.

*Example 15.*—Five parts of nylon 66 staple were soaked for about two hours at 25° C. in an emulsion consisting of 5 parts ammonium sulfide, 5 parts carbon disulfide, 0.05 part of a surfactant mixture having an Atlas HLB–11 rating (see Example 1) and 90 parts of water. The so thioated nylon was washed free of soluble products and suspended for 5.5 hours at 50° C. in an emulsion composed of 5 parts acrylonitrile, 0.2 part Tween 85, 95 parts distilled water and 3 parts of 30% hydrogen peroxide. The reaction was terminated by thoroughly washing the product with water. The oven-dried product totalled 6.1 parts.

*Example 16.*—Five parts of nylon 66 staple were thioated for two hours at about 25° C. in a 6% solution of disodium dithiocarbonate which had been prepared by reacting 16.8 parts of sodium bicarbonate with 7.6 parts carbon disulfide in 275 parts water until a clear, orange, homogeneous solution resulted. This thioated nylon was washed thoroughly with water, then suspended for four hours at 50° C. in an emulsion composed of 1 part acrylonitrile, 4 parts styrene, 0.5 part Tween 85, and 95 parts of distilled water to which suspension of fibers were added 3 parts of 30% hydrogen peroxide. The reaction was terminated by washing the copolymerized product thoroughly with water. After drying, the product yield amounted to 6.1 parts.

*Example 17.*—Five parts of nylon 66 staple were thioated in the manner described in Example 16, then suspended in an emulsion prepared from 5 parts ethyl acrylate, 0.2 part Tween 85, 95 parts distilled water and 3 parts of 30% hydrogen peroxide. After a reaction time of about four hours at 50° C., the product was washed contained 0.9 part of hydrogen peroxide and 0.35 part of Tween 85. The copolymeric products were washed thoroughly with water and dried in a warm oven before product yields were determined.

TABLE I

| Experiment Number | Monomer | Percent by Weight of Monomer in Polymerization Emulsion | Weight of Thioated Nylon before Polymerization | Weight of Nylon Copolymer after Polymerization |
|---|---|---|---|---|
| A | Vinylidene chloride | 5 | 5.2 | 7.2 |
| B | 2-chloroethylacrylate | 7 | 5.3 | 10.9 |
| C | Glycidyl acrylate | 7 | 5.2 | 10.1 |
| D | Vinyl toluene | 6 | 5.0 | 8.0 |
| E | Ethylmethacrylate | 8 | 5.0 | 8.6 |
| F | Methyl methacrylate | 5 | 5.0 | 8.9 |
| G | N-vinyl pyrrolidone/acrylonitrile | 10 | 5.0 | 6.0 |
| H | Dibutyl fumarate/acrylonitrile | 10 | 5.0 | 6.7 |
| I | Dibutylmaleate/acrylonitrile | 10 | 5.0 | 7.6 |

*Example 20.*—Nylon 66 knitted socks were thioated in the manner described in Example 19 above and, after being thoroughly washed with water, were suspended for 20 hours at 50° C. in 100 parts of a solution of various monomers, each of which contained 0.9 part of hydrogen peroxide. The copolymer products were washed thoroughly with water and dried in a warm oven before product yields were determined.

TABLE II

| Experiment Number | Monomer | Percent by Weight of Monomer in Polymerization Emulsion | Weight of Thioated Nylon before Polymerization | Weight of Nylon Copolymer after Polymerization |
|---|---|---|---|---|
| A | Hydroxypropyl acrylate | 6 | 5.3 | 5.9 |
| B | Hydroxyethyl acrylate | 7 | 5.3 | 7.4 |
| C | Hydroxypropyl methacrylate | 6 | 5.0 | 10.7 |
| D | Acrolein | 5 | 4.0 | 5.3 |
| E | N,N-dimethylamino-ethylmethacrylate/acrylic acid | 10 | 5.0 | 5.6 | thoroughly with water and oven-dried. The yield of copolymer amounted to 7.1 parts.

*Example 18.*—Fifteen parts of nylon 66 staple were thioated by being soaked for 0.25 hour in a 5% solution of sodium hydroxide; then the alkali-wetted nylon was transferred into an atmosphere of carbonyl sulfide for 0.25 hour at 25° C. The thioated nylon was then washed thoroughly with water to remove all water-soluble materials.

(A) Five parts of the above thioated nylon were placed in 100 parts of a 10% solution of acrylic acid containing 3 parts of 30% hydrogen peroxide for 20 hours at 50° C. The resulting product, after washing and oven-drying, weighed 6.0 parts.

(B) Five parts of the above thioated nylon were suspended for 20 hours at 50° C. in 100 parts of a 10% emulsion of acrylonitrile containing 3 parts of 30% hydrogen peroxide. The washed and dried copolymeric product amounted to 6.5 parts.

(C) Five parts of the above thioated nylon staple were suspended for 20 hours at 50° C. in 100 parts of 10% emulsion of ethyl acrylate containing 3 parts of 30% hydrogen peroxide. The product yield, after being washed and oven dried, amounted to 7.3 parts.

*Example 19.*—Nylon 66 knitted socks were thioated by being soaked for about 3 hours at 25° C. in 100 parts of an emulsion of carbon disulfide composed of 6 parts of sodium hydroxide, 7.5 parts of carbon disulfide, 0.05 part of a surfactant mixture having an Atlas HLB-11 rating (see Example 1), and 86.5 parts of water. After thioation, the knitted socks were washed thoroughly with water to remove soluble materials, then suspended in 100 parts of an emulsion of various monomers, each of which Although all the examples shown in Table II illustrate copolymers of the polyamide-nylon 66, this invention is equally applicable to such long-chain, water-insoluble, synthetic polyamides as nylon 26, 28, 82, etc., as well as such polyamides as nylon 4, 6, 7, 9, 11, etc., because of the generic reaction involved.

*Example 21.*—An oven dried strip (204.7 parts) of Celanese nylon tricot 40/13 was wound on a perforated 1⅝″ diameter stainless steel beam and inserted in a suitable container having inlet and outlet streams for reactants as well as recycling means. This fabric was scoured by pumping 14,000 parts of a 0.5% aqueous solution of Surfynol 465 (a 65% ethylene oxide adduct of 2, 4, 7, 9-tetramethyl-5-decyne-4, 7-diol) at 77° C. and at a flow rate of 3780 parts per minute for 20 minutes. Four water rinses, each consisting of 14,000 parts, were used to remove surfactant. Thioation of the nylon was carried out with 14,000 parts of an emulsion consisting of 8% sodium hydroxide, 5% carbon disulfide, 0.025% disodium ethylene-diaminetetra-acetic acid, and 0.05% HLB #11 (see Example 1). The unit was pressurized to 15 p.s.i.g. with nitrogen and the liquor pumped (while heating to 60° C. maximum) for 15 minutes at the rate of 3,780 parts per minute. Three water washes of 14,000 parts each were carried out at 39° C. at the rate of 3,780 parts per minute flow. Copolymerization was carried out with 14,000 parts of an emulsion composed of 2.85% acrylonitrile, 2.85% acrylic acid, 0.01% styrene, 0.18% of 85% phosphoric acid, 0.1% of HLB #13 (a mixture consisting of 81.7% polyoxyethylene (20) sorbitan monooleate and 18.3% of sorbitan monooleate); 0.75% hydrogen peroxide and 0.33% ammonium persulfate. The initial pH was 2.2. This monomer-catalyst system was circulated at 30,000 parts per minute for 45 minutes at 50° C., then for an additional 45 minutes at 60° C. After the polymerization liquor was drained, homopolymer was removed and the copolymerized nylon-acrylonitrile was hydrolyzed with 14,000 parts of 3% sodium hydroxide solution pumped through the reactor at the rate of 3,780 parts per minute for 60 minutes at 85° C. The alkali liquor was drained off and the hydrolyzed nylon copolymer was washed with three 14,000 part portions of water, each for 3 minutes at a flow rate of 3,780 parts per minute. The resultant sodium salt of the nylon copolymer was converted to the magnesium salt by circulating 14,000 parts of a 1% magnesium chloride solution through the reactor for 20 minutes at 75° C. Excess magnesium chloride solution was removed by three 14,000 part, four-minute washes at a flow rate of 30,000 parts per minute.

The product, after oven-drying at 105° C. overnight, amounted to 246 parts or 120.3% of the initial nylon substrate weight.

*Example 22.*—Nylon 6 and nylon 66 were copolymerized with mixtures of acrylonitrile and acrylic acid, with or without small amounts of additional vinyl monomers such as styrene, acrylic acid esters, methacrylic acid esters, etc., by the thioation technique of activation described in Example 21 in which the nylon substrate was exposed to an emulsion of carbon disulfide in alkali; after rinsing with water, the thioated substrate was copolymerized with acrylonitrile-acrylic acid mixtures of monomers at controlled pH values below pH 7.0, using hydrogen peroxide with or without added hydroperoxides or persulfates as catalysts.

By treating the reaction products with dilute alkali, homopolymers can be simultaneously dissolved and removed and all or part of the nitrile groups present in the nylon copolymer are hydrolyzed to carboxylic acid groups. The free acid forms are obtained by steeping the salt form in dilute acetic acid or other acid followed by thorough washing.

While the free acid forms or the sodium salt forms of the copolymerized nylon exhibit moisture regains above those of untreated nylon, conversion to metal salts such as aluminum, magnesium, etc. enhances this property. Moreover, treatment of the copolymerized product at pH 4 with a quaternary amine such as Ethomeen T/12 (an Armour Chemical Co. product of a tallow amine with two polyoxyethylene groups attached to the nitrogen), enhances the conductivity and greatly reduces static charge propensity and appears to be retained through multiple launderings. It has further been discovered that a soap (such as Ivory Flakes, which are made from sodium salts of long-chain fatty acids well known in soap making art), or even a detergent (such as Fab, which is a long-chain alkyl aryl sodium sulfonate), when used to repeatedly launder the copolymerized nylon (after hydrolysis) promotes the decay rate of static electrical charges. This effect is not observed on washing untreated nylon.

By following the copolymerization techniques described above, moisture regains have been increased from the 3 to 3.5% range to the 6 to 14% range by copolymerization followed by alkaline hydrolysis to convert —CN groups to —COOH with tertiary amine compounds such as Ethomeen T/12 to form a tertiary ammonium salt of the copolymerized nylon. Such copolymerized products exhibit better abrasion resistance than untreated nylon, improved dyeability, greater resistance to soiling, higher melting points as well as the improved moisture regain.

*Example 23.*—A 143 part specimen of 840 denier, 140 filament nylon yarn which had no prior treatment to remove finishes, lubricants, etc. was thioated by winding the yarn on a perforated tube and treated as in Example 21 by pumping an emulsion composed of 6.5 parts of sodium hydroxide, 125 parts of carbon disulfide, 5 parts of HLB #11 (see Example 1), 2.5 parts of disodium ethylenediamine tetraacetic acid and 2,302 parts of distilled water for 60 minutes at a flow rate of 2,000 parts per minute at about 27° C. The liquor was drained from the reactor and the yarn washed with three 3,000-part portions of water at about 25° C. Each lot of wash water was pumped at a flow rate of 2,000 parts per minute for four minutes (two minutes in each direction). Next, the polymerization was carried out by pumping the following emulsified mixture through the thioated nylon: 60 parts of acrylonitrile, 7.5 parts of 2-ethylhexyl acrylate, 7.5 parts of stearyl methacrylate, 1,126 parts of pH 4.0 buffer solution, 1,198 parts of water, 1.5 parts of HLB #13 (see Example 21), 83.5 parts of 30% hydrogen peroxide, 1 part of 70% t-butyl-hydroperoxide, for 130 minutes at a flow rate of 1,500 parts per minute and at about 50° C. The resultant product was washed thoroughly and the dried yield was 154 parts.

*Example 24.*—A 38.2 part specimen of 210 denier nylon yarn prepared as in Example 23, was thioated as described in Example 21 with an emulsion composed of 50 parts of sodium hydroxide, 100 parts of carbon disulfide, 2,341 parts of water, 4 parts of HLB #11 (see Example 1), and 2.5 parts of disodium ethylenediaminetetraacetic acid. The thioated package was washed three times with 2,500 part portions of water, each pumped through the package at a flow rate of about 4,000 parts per minute for about 4 minutes. The washed, thioated nylon was copolymerized by pumping the following monomer mixture through the nylon for 120 minutes at a flow rate of 4,000 parts per minute and at 50° C.: 250 parts of glacial acrylic acid, 2,168 parts of water, 74.9 parts of 30% hydrogen peroxide, 0.9 part of 70% t-butyl hydroperoxide and 82 parts of 10% sodium hydroxide solution to adjust the mixture to pH 3.0.

The copolymerized product, after thoroughly washing and drying, consisted of 39.3 parts. This yarn was hydrophilic instead of showing the normal hydrophobic properties of untreated nylon. Basic dye stuffs were readily sorbed.

*Example 25.*—Five parts of nylon 66 in the form of a knitted sock was thioated for ten minutes at 25° C. in the manner described in Example 1. After being washed thoroughly on a Büchner funnel with water to remove all soluble by-products, the thioated sock was suspended in 100 parts of a 0.04% aqueous ferrous ammonium sulfate solution to metathetically form the ferrous derivative. Following thorough washing to remove all excess ferrous ions, the ferrated product was added to an emulsion consisting of 10 parts of vinyl acetate in 90 parts of distilled water with 0.4 part Tween-85 and 3 parts of 30% hydrogen peroxide. After four hours at 65° C., the reaction was terminated by thoroughly washing the copolymeric product with water. The air-dried product weighed 6.3 parts.

*Example 26.*—Five parts of nylon 66 in the form of a knitted sock was thioated for ten minutes at 25° C. then ferrated as described in Example 25. The reactive intermediate was suspended for four hours at 50° C. in an emulsion prepared from the five parts styrene, five parts vinyl acetate, 100 parts distilled water, 0.8 part Tween-85 and 3 parts of 30% hydrogen peroxide. At the end of this reaction time, the copolymeric product amounted to 6.8 parts after thorough washing and drying.

The practicality of the products arising from the practice of this invention is immediately evident. Nylon staple, yarns and fabrics which have been copolymerized with vinyl monomers by the processes of this invention derive special and useful properties not present in the untreated nylon. By the proper choice of vinyl monomers, such as the sodium salt of copolymerized polyacrylic acid, nylon having improved electrical properties, fabrics with increased moisture retention and a high degree of soil resistance are easily prepared. Nylon cord with better compatibility with rubber and improved flow characteristics can be realized by using monomers such as acrylonitrile, styrene and mixtures of these monomers with acrylic esters, just to name a few. One knowledgeable in the textile arts and polymer chemistry can readily see innumerable advantageous combinations of nylon with vinyl polymers which have economically useful applications.

What is claimed is:

1. The process of producing a graft copolymer of ethylenically unsaturated compounds and derivatives of polyamides which comprises the steps of (a) forming a water insoluble thioated derivative of a water-insoluble polyamide by reacting a water-insoluble synthetic linear polyamide having an amide group as part of a recurring polymeric unit at an alkaline pH with at least one compound of the formula $$X=C=X$$

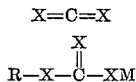

and

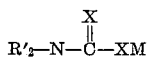

wherein X is oxygen or sulfur, at least one of which is sulfur, wherein at least one M is selected from at least one member of the group consisting of hydrogen, alkali metal, ammonium, or organic ammonium, phosphonium and sulfonium ion, wherein R is selected from at least one member of the group consisting of M, hydrogen, and lower alkyl, and R' is selected from at least one member of the group consisting of hydrogen and lower alkyl; and (b) graft polymerizing the thioated polyamide, said thioated polyamide being substantially free from water soluble by-products resulting from the formation of the thioated polyamide, via peroxidic free radical initiation, with at least one ethylenically unsaturated monomer.

2. The products obtained according to the process of claim 1.

3. The process according to claim 1 wherein the monomer is a vinyl monomer having the ethylenic group at an unsubstituted terminal carbon atom.

4. The process according to claim 1 wherein the monomer is a vinyl compound of the formula $H_2C=CR_1R_2$ in which if $R_1$ is hydrogen, then $R_2$ is aryl, and if $R_1$ is hydrogen, methyl or ethyl, then $R_2$ is —CN, or $R_2$ is

in which $R_3$ is hydrogen or alkyl, or halo, cyano or hydroxy substituted ethyl, propyl or butyl, or $R_2$ is

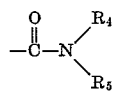

$R_4$ and $R_5$ being hydrogen or alkyl, or $R_2$ is

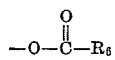

$R_6$ being hydrogen, methyl, ethyl or ethylene, or $R_2$ is a halogen or a heterocyclic group, or the monomer is acrolein, vinylidene chloride, vinyl methyl ether, vinyl ethyl ether or divinyl sulfone.

5. The process according to claim 3 wherein the monomer is acrylic acid.

6. The process according to claim 3 wherein the monomer is acrylonitrile.

7. The process according to claim 3 wherein the monomers are acrylonitrile and styrene.

8. The process according to claim 3 wherein the monomer is vinylidene chloride.

9. The process according to claim 3 wherein the monomer is acrylamide.

10. The process according to claim 1 wherein carbon disulfide or an alkali-metal salt thereof is employed to produce the thioated polyamide.

11. The process according to claim 10 wherein the starting polyamide, wet with alkali, is contacted with carbon disulfide.

12. The process according to claim 10 wherein the starting polyamide is contacted with the reaction product of carbon disulfide and a base.

13. The process according to claim 12 wherein the base is an alkali metal hydroxide.

14. The process according to claim 4 wherein the polyamide is a hexamethylenediamine adipic acid polyamide.

15. The products obtained according to the process of claim 14.

16. The process according to claim 4 wherein the graft polymerization is conducted in an aqueous polymerization system in which the monomer is uniformly distributed.

17. The process according to claim 16 wherein the peroxidic initiator is hydrogen peroxide.

18. The process according to claim 16 wherein the reaction is conducted in water.

19. The process according to claim 18 wherein the reaction is conducted in the presence of at least one of an emulsifying agent sufficient to form a stable emulsion and a wetting agent.

20. The process according to claim 1 wherein the thioated polyamide is a salt of at least one member of the group selected from ammonium, primary, secondary, tertiary amine, quaternary ammonium, tertiary sulfonium, quaternary phosphonium, quaternary arsonium, quaternary stibonium, lithium, sodium, potassium, Ge, Sn, Pb, Bi and metals in the Periodic Table's Groups I$b$, II$a$, II$b$, III$a$, III$b$, IV$b$, V$b$, VI$b$, VII$b$ and VIII.

21. The process according to claim 18 wherein the thioated polyamide is a a high molecular weight, fiber forming polyamide having a non-tacky surface at room temperature and an average molecular weight of about 10,000.

22. The process according to claim 20 wherein the salt is an ammonium salt.

23. The process according to claim 20 wherein the salt is the sodium salt.

24. The process according to claim 20 wherein the salt is the ferrous salt.

25. The process according to claim 1 which includes the step of converting a thioated polyamide salt metathetically to another salt thereof.

26. The process according to claim 25 wherein the salt converted metathetically to another salt is the sodium or ammonium salt.

27. The process according to claim 25 wherein the metathetically produced salt is the salt of a metal selected from the group consisting of Ge, Sn, Pb, Bi and metals in the Periodic Table's Groups I$b$, II$a$, II$b$, III$a$, III$b$, IV$b$, V$b$, VI$b$, VII$b$, and VIII.

28. The process according to claim 1 wherein the thioated polyamide is a salt produced by reacting metathetically a thioated polyamide salt of at least one member of the group consisting of ammonia, primary, secondary, tertiary amine, quaternary ammonium, tertiary sulfonium, quaternary phosphonium, quaternary arsonium, quaternary stibonium, lithium, sodium and potassium with a water-soluble salt of at least one metal selected from the group consisting of Ge, Sn, Pb, Bi and metals in the Periodic Table's Groups I$b$, II$a$, II$b$, III$a$, III$b$, IV$b$, V$b$, VI$b$, VII$b$, and VIII.

29. The process according to claim 28 wherein the thioated polyamide is a a high molecular weight, fiber forming polyamide having a non-tacky surface at room temperature and an average molecular weight of about 10,000.

No references cited.

MURRAY TILLMAN, *Primary Examiner.*

P. LIEBERMAN, *Assistant Examiner.*